(12) United States Patent  (10) Patent No.: US 7,752,991 B2
Graves  (45) Date of Patent: Jul. 13, 2010

(54) TRANSPORTATION SAFETY DEVICE

(76) Inventor: James D Graves, 14057 27th Ave. NE., Seattle, WA (US) 98125

( * ) Notice: Subject to any disclaimer, the term of this patent is extended or adjusted under 35 U.S.C. 154(b) by 173 days.

(21) Appl. No.: 12/037,866

(22) Filed: Feb. 26, 2008

(65) Prior Publication Data

US 2009/0211513 A1     Aug. 27, 2009

(51) Int. Cl.
    *B60Q 1/54* (2006.01)
(52) U.S. Cl. .............. 116/28 R; 116/63 P; 40/590; 280/455.1; 160/10
(58) Field of Classification Search .............. 116/28 R, 116/30, 173, 63 P, 63 R; 160/10, 24; 248/503; 40/590, 591; D10/109–111, 114; 362/485, 362/486; 280/455.1
    See application file for complete search history.

(56) References Cited

U.S. PATENT DOCUMENTS

| 1,535,844 | A | * | 4/1925 | McLemore | 40/563 |
| 2,852,886 | A | * | 9/1958 | Parker | 446/404 |
| 2,975,401 | A | * | 3/1961 | Shupe | 340/431 |
| 2,997,573 | A | * | 8/1961 | Nyborg | 362/267 |
| 3,379,456 | A | * | 4/1968 | Bogie | 280/455.1 |
| 3,419,926 | A | * | 1/1969 | Magin | 114/354 |
| 3,512,288 | A | * | 5/1970 | Hall | 40/590 |
| 3,678,886 | A | * | 7/1972 | Tibbet | 116/173 |
| 3,920,266 | A | * | 11/1975 | Rendessy | 280/455.1 |
| 3,945,337 | A | * | 3/1976 | Sweetman | 116/36 |
| 3,989,269 | A | * | 11/1976 | Rendessy | 280/455.1 |
| 4,052,085 | A | * | 10/1977 | Rendessy | 280/455.1 |
| 4,198,073 | A | * | 4/1980 | Olsen | 280/406.2 |
| 5,016,899 | A | * | 5/1991 | Euteneier | 280/446.1 |
| 5,979,355 | A | * | 11/1999 | LeBlanc | 116/30 |
| 6,295,945 | B1 | * | 10/2001 | Amanze | 116/173 |
| 7,164,352 | B2 | * | 1/2007 | Nelson | 340/472 |
| 7,395,776 | B2 | * | 7/2008 | Harruna | 116/28 R |
| 7,540,523 | B2 | * | 6/2009 | Russell et al. | 280/455.1 |

* cited by examiner

*Primary Examiner*—R. A. Smith
*Assistant Examiner*—Tania C Courson
(74) *Attorney, Agent, or Firm*—Christensen O'Connor Johnson Kindness, PLLC

(57) ABSTRACT

The invention relates to a visual warning device adapted to extend between a first cargo-carrying unit and a second cargo-carrying unit. The visual warning device includes a first mounting adapted to attach to the first cargo-carrying unit, a second mounting adapted to attach to a second cargo-carrying unit, and a conspicuous, elongate belt that engages the first and second mountings. The invention also relates to a method for providing a visual indicator of a region between a dump truck and a pull trailer.

23 Claims, 3 Drawing Sheets

TRANSPORTATION SAFETY DEVICE

FIELD OF THE INVENTION

The invention relates generally to the field of transport equipment, and in particular to visual warning devices.

BACKGROUND

Trucks are often used to transport large loads of cargo. In some situations the operator of a truck can maximize the amount of cargo hauled during a trip by carrying a load mounted on the truck and drawing a pull trailer carrying additional cargo. For example, a transfer dump truck can tow a pull trailer that has an additional dump truck body mounted to it. In this way the truck can carry nearly twice as much cargo to or from a work site in a single trip. Local and/or federal laws limit the weight of the load a truck is allowed to carry based on the number of axles and the spacing between the axles. The use of a pull trailer allows a truck to carry a larger load than the law would normally permit the truck to carry alone.

Dump trucks have often made use of such functionality by towing a pull trailer. An advantage of using a pull trailer is that a dump truck can transport a large load because of the extended wheel base of the truck and pull trailer, and yet can still have good maneuverability at the dump site because of the short wheel base of the dump truck. Two kinds of pull trailers are pup trailers and transfer trailers. A pup trailer typically has its own hydraulics to facilitate dumping of a load. In contrast, a transfer trailer does not have dumping hydraulics. The body of a transfer trailer is transferred into the dumping body on the truck in order for the load to be dumped.

A pull trailer is usually secured to a dump truck with a drawbar. The drawbar is typically fairly long, for example fifteen feet, in order to accomplish the necessary spacing between the dump truck and pull trailer. This spacing is required to provide the proper axle and wheel loads so that the loads of the two vehicles are not localized over too short a length, which would jeopardize bridges and other roadways susceptible to damage from excessive loading. In addition, most vehicle codes or similar statutes in various jurisdictions governing the load and axle limits of trucks and trailers require certain axle spacing and vehicle lengths.

Although a lengthy trailer drawbar is necessary to meet certain requirements under load conditions, such a drawbar adversely affects the maneuverability and safety of the combined dump truck and pull trailer. In particular, a lengthy drawbar presents an extremely dangerous situation for unwary motorists, cyclists, and pedestrians who fail to notice the drab, low-slung drawbar and become caught in the interval or gap between the dump truck and the pull trailer. For example, a driver interpreting visual cues in order to maneuver in traffic is likely to perceive the end of the dump truck as just that, the end of the dump truck. Changing lanes behind a truck-trailer combination with few or no visual cues other than a long, low drawbar that is not visible to the driver could cause the driver to become caught between the truck and pull trailer, or to collide with the drawbar. Likewise, a pedestrian preparing to cross the street may step off the curb after a dump truck has passed, unaware that a pull trailer is in tow, and be hit by the pull trailer. This type of accident occurred in Redmond, Wash., on Oct. 19, 2007, when a 21-year old man was hit and killed by the rear trailer of a dump truck. The majority of these collisions are attributable to the driver's (or pedestrian's) failure to notice the drawbar and/or the connected pull trailer. Accordingly, many accidents could be prevented by providing better visual and/or audible indicators of the trailer.

SUMMARY

In one aspect, the invention relates to a visual warning device adapted to extend between a first cargo-carrying unit and a second cargo-carrying unit that is towed following the first cargo-carrying unit. The visual warning device includes:
 (a) a first mounting adapted to attach to the first cargo-carrying unit;
 (b) a second mounting adapted to attach to the second cargo-carrying unit; and
 (c) a first conspicuous, elongate belt having a first end that engages the first mounting and a second end that engages the second mounting.

In one embodiment of the visual warning device, the first mounting has a first plate portion that is fixedly attached to the first cargo-carrying unit and a second plate portion that is pivotably attached to the first plate portion. The first end of the elongate belt releasably engages the second plate portion. In one embodiment, the second plate portion also has an aperture and the first end of the elongate belt also has a rigid hook that engages the second plate portion through the aperture.

In one embodiment, one of the first and second mountings adjustably engages the elongate belt such that the effective length of the elongate belt is adjustable. In one embodiment, the elongate belt has a locking device for fastening the elongate belt at a predetermined effective length.

In one embodiment, at least one of the first or second mountings comprises a take-up reel for the elongate belt.

In one embodiment, the visual warning device has a second conspicuous, elongate belt. The first elongate belt is attached on a right side of the first and second cargo-carrying units, and the second elongate belt is attached on a left side of the first and second cargo-carrying units.

In one embodiment, the visual warning device includes an equalizer strap. A first end of the equalizer strap is attached to the first elongate belt, and a second end of the equalizer strap is attached to the second elongate belt.

In one embodiment, the elongate belt is made of an elastic material. The elongate belt can also be made of a reflective material, a brightly-colored material, or have an illuminated surface. In another embodiment, the elongate belt has an abrasive outer surface so that the belt produces an audible sound when contacted at freeway speeds.

In another aspect the invention relates to a warning device for use with a transfer dump system having a dump truck and a pull trailer. The warning device includes:
 (a) a first bracket adapted to be connected to the dump truck;
 (b) a second bracket adapted to be connected to the pull trailer; and
 (c) a conspicuous, tensioned strap extending between the dump truck and the pull trailer. The tensioned strap has a first end that is connected to the first bracket and a second end that is connected to the second bracket.

In one embodiment of the warning device, the first bracket and the second bracket are disposed between 48 inches and 80 inches above ground level.

In one embodiment, the tensioned strap is releasably connected to one of the first and second brackets. In one embodiment, the effective length of the tensioned strap is adjustable.

In one embodiment, the tensioned strap is made of an elastic, brightly colored material. The tensioned strap can also be made of a reflective material.

In yet another aspect, the invention relates to a method of providing a visual indicator of a region between a dump truck and a pull trailer. The method includes:

(a) providing a first bracket adaptable to the dump truck;
(b) providing a second bracket adaptable to the pull trailer;
(c) attaching a conspicuous, adjustable belt extending between the dump truck and the pull trailer, wherein the adjustable belt has a first end that is connected to the first bracket and a second end that is connected to the second bracket; and
(d) adjusting the length of the adjustable belt such that the effective length of the adjustable belt is comparable to the interval between the dump truck and the pull trailer.

In one embodiment, the adjustable belt is releasably connected to one of the first and second brackets. In one embodiment, the method includes a locking device that can be used to attach a length of the adjustable belt to itself.

In one embodiment, the adjustable belt is reflective.

In one embodiment, the method also includes attaching the adjustable belt to a right side of the dump truck and the pull trailer, and to a left side of the dump truck and the pull trailer.

DETAILED DESCRIPTION

The present invention relates to a visual warning device that is adapted to extend between a first cargo-carrying unit and a second cargo-carrying unit that is towed following the first cargo-carrying unit. For example, in the field of transport equipment, the first cargo-carrying unit can be a dump truck, and the second cargo-carrying unit can be a pull trailer. Although the invention is described with respect to a dump truck and a pull trailer, it can be used with any combination of vehicles with a significant spacing between the first and second cargo-carrying units.

Figure 1:
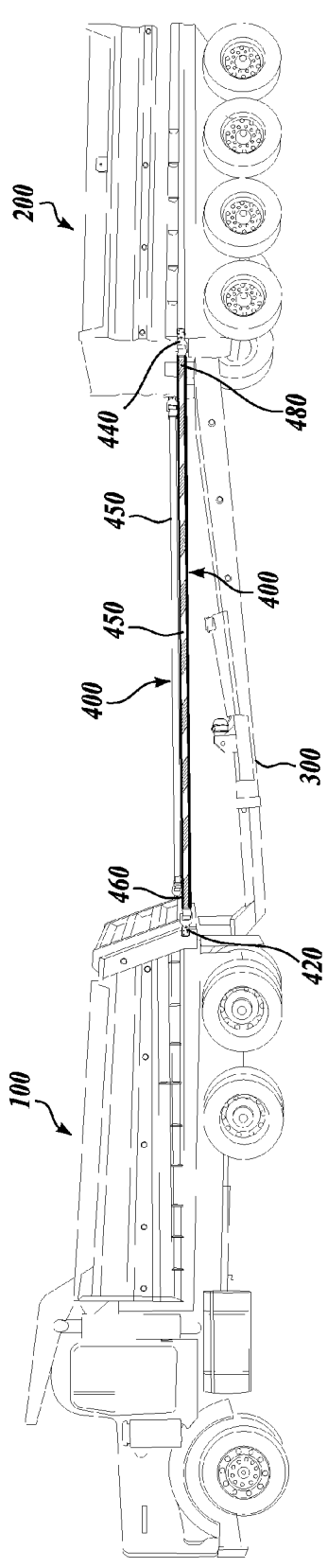
FIG. 1 is a side elevation view of a dump truck and pull trailer with a visual warning device in accordance with the present invention.

FIG. 1 is a side elevation view of a dump truck and pull trailer with a visual warning device. Referring to FIG. 1, a dump truck 100 and a pull trailer 200 are connected with a drawbar 300. The visual warning device 400 extends between the dump truck 100 and the pull trailer 200 and is disposed at a higher elevation than the connecting drawbar 300.

The visual warning device 400 includes a first mounting 420 attached to the dump truck 100, and a second mounting 440 attached to the pull trailer 200. The first and second mountings 420, 440 are firmly attached, for example by bolting or welding. The visual warning device 400 also has a conspicuous, elongate belt 450 having a first end 460 that engages the first mounting 420 and a second end 480 that engages the second mounting 440.

Figure 2:
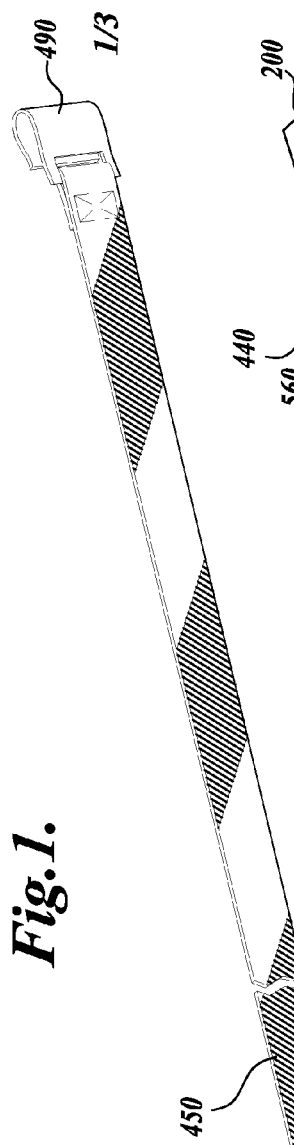
FIG. 2 is a perspective view of the visual warning device shown in FIG. 1, showing details of the rigid hook at each end.
Figure 3:
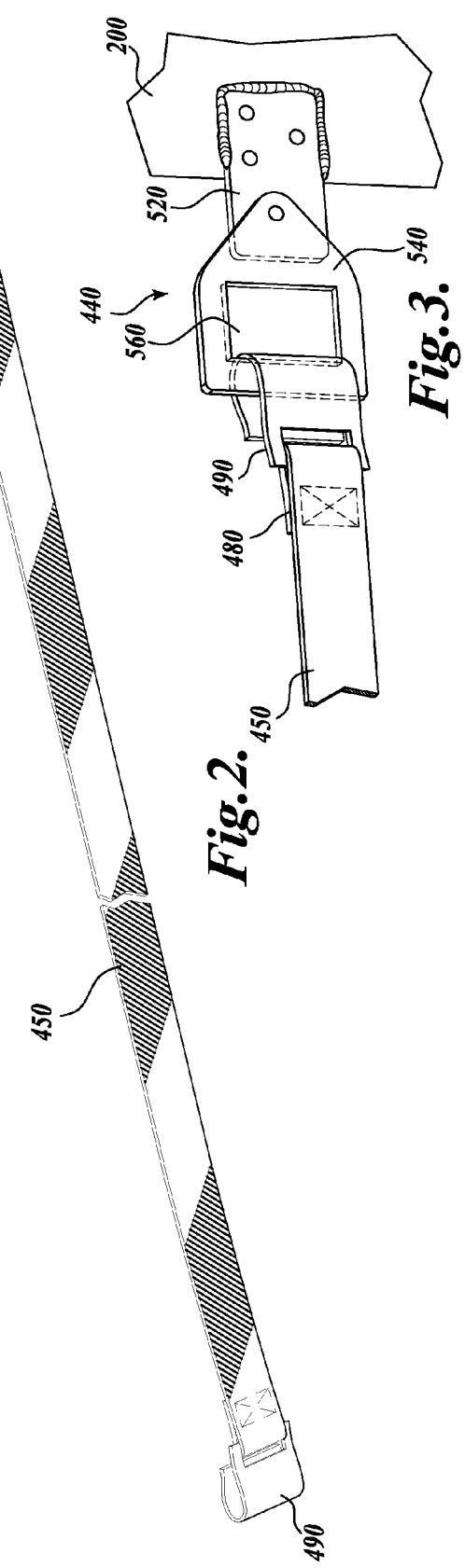
FIG. 3 is a fragmentary perspective view of a representative mounting for the visual warning device shown in FIG. 1.

FIG. 3 is a fragmentary perspective view showing the second mounting 440, which is substantially identical to the first mounting 420. Referring to FIG. 3, in one embodiment, the second mounting 440 includes a first plate portion 520 that is fixedly attached to the pull trailer 200, and a second plate portion 540 that is pivotably attached to the first plate portion 520. In this embodiment, the second end 480 of the elongate belt 450 releasably engages the second plate portion 540. The second plate portion 540 includes an aperture 560, and the second end 480 of the elongate belt 450 has a rigid hook 490 that engages the second plate portion 540 through aperture 560. The elongate belt 450 and rigid hooks 490 are also shown in FIG. 2.

The distance between the dump truck 100 and the pull trailer 200 may depend on several factors, including the load and axle limits of the dump truck 100 and pull trailer 200, as well as individual variation among manufacturers. In order to accommodate these differences, drawbars 300 are available in different lengths, and some drawbars are adjustable. The effective length of the elongate belt 450 is also adjustable so that it can accommodate varying intervals between the dump truck 100 and pull trailer 200. Referring to FIG. 1, in one embodiment, the first mounting 420 and second mounting 440 can adjustably engage the elongate belt 450 such that the effective length of the elongate belt 450 is adjustable.

Figure 4:
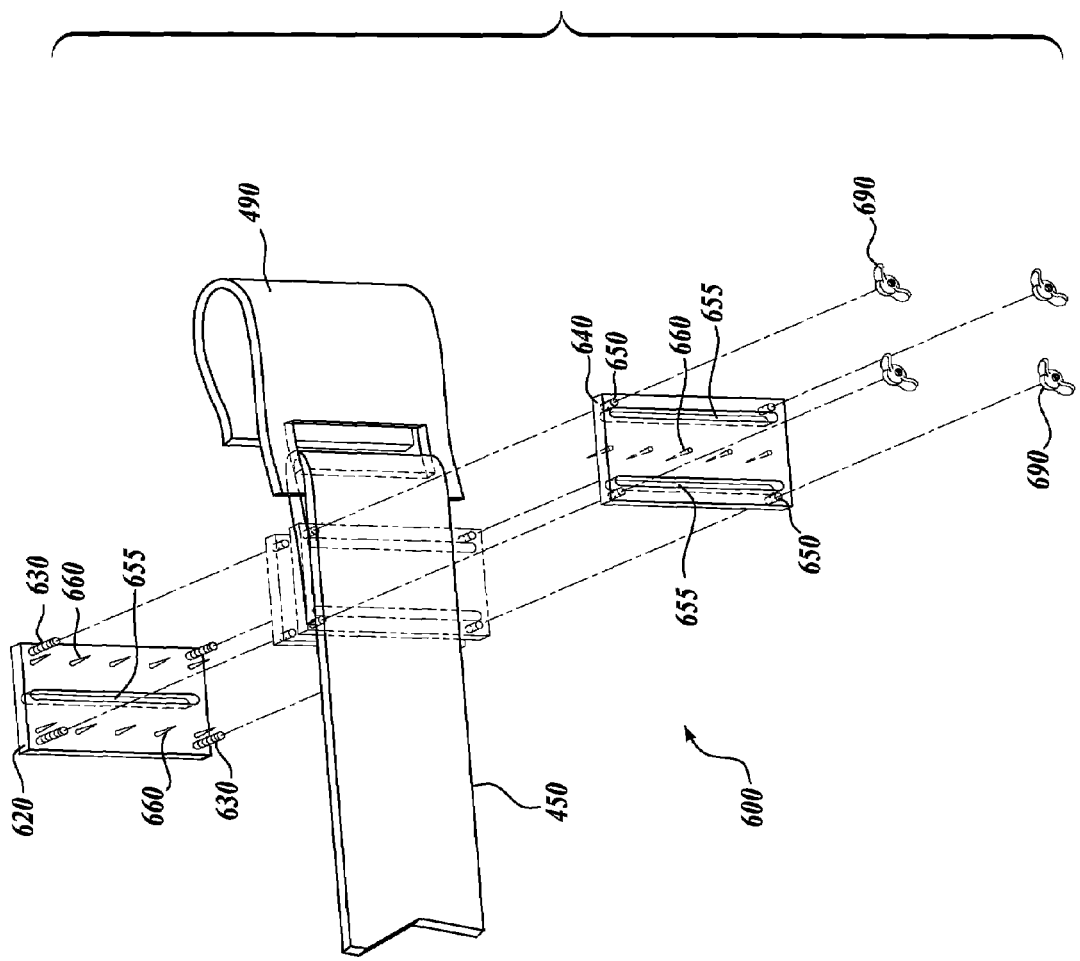
FIG. 4 is an exploded view of a locking device for use with the visual warning device shown in FIG. 1.

Once the elongate belt 450 has been adjusted to an appropriate length, the belt can be secured with a locking device 600. FIG. 4 is an exploded view of the locking device 600 for use in the visual warning device shown in FIG. 1. Referring to FIG. 4, the locking device 600 includes a base plate 620 and a cover plate 640. One end of the elongate belt 450 is passed through an opening of a rigid hook 490. The end of the elongate belt 450 is folded back along the belt, and base plate 620 and cover plate 640 are positioned on opposing sides. Threaded studs 630 mounted firmly in the base plate 620 are aligned with corresponding holes 650 in the cover plate 640. As the threaded studs 630 are tightened, the plates 620, 640 are drawn together. Pins 660 are adapted to extend through the elongate belt 450, through the end of the elongate belt 450, and through one of the elongate slots 655. The threaded studs 630 are then tightened with an appropriate closure, for example with wing nuts 690. The locking device 600 can be removed and repositioned in order to re-adjust the length the elongate belt 450.

Figure 5:
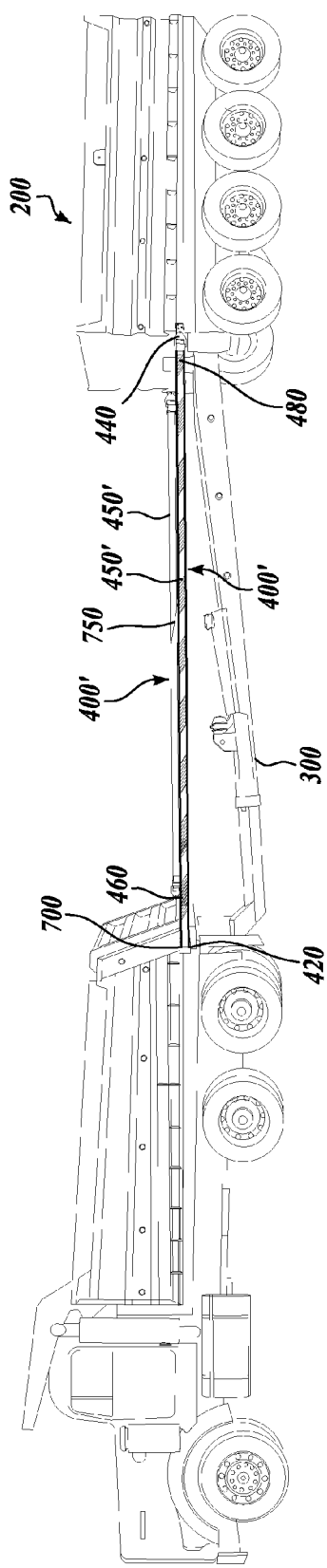
FIG. 5 is a side elevation view of a dump truck and pull trailer with an alternative embodiment of a visual warning device in accordance with the present invention.

FIG. 5 depicts another embodiment of the visual warning device 400'. In this embodiment, at least one of the first or second mountings 420, 440 is replaced with a take-up reel 700 for the elongate belt 450'. The take-up reel 700 can be positioned at any convenient location on the dump truck 100 or the pull trailer 200. Referring to FIG. 5, the take-up reel 700 is positioned on the dump truck 100. The take-up reel 700 winds up and stores any excess length of the elongate belt 450'. The take-up reel 700 also permits the elongate belt 450' to extend or retract, as necessary, while the vehicle maneuvers around a turn or corner. In this way, the take-up reel 700 contributes to maintaining an effective tension in the elongate belt 450'. The take-up reel 700 also allows for emergency retraction of the elongate belt 450' if the elongate belt 450' breaks. In a further embodiment, the take-up reel 700 can be locked to prevent the elongate belt 450' from extending or retracting. The take-up reel 700 can also be unlocked in order to permit an operator to remove and replace the elongate belt 450' as needed, for example, when removing a pull trailer 200, adding a pull trailer 200, or adjusting the length of the tow bar 300.

The position of the first and second mountings 420, 440 on the dump truck 100 and pull trailer 200 can be varied for maximum visibility of the elongate belt 450. As shown in FIG. 1, the elongate belt 450 extends from a side wall of the rear portion of the dump truck 100 to a side wall of the front portion of a pull trailer 200. However, the elongate belt 450 can be attached at any point along the dump truck 100 or pull trailer 200, provided that the elongate belt 450 spans the intervening space.

The visual warning device 400 includes at least one elongate belt 450. In the preferred embodiment, shown in FIG. 1, the visual warning device 400 includes at least two elongate belts 450. The first elongate belt is attached to the right side of the dump truck 100 and pull trailer 200, and the second elongate belt is attached to the left side of the dump truck 100 and pull trailer 200. A set of two elongate belts 450, one on each side of the dump truck and pull trailer, has increased visibility over a single elongate belt on only one side of the dump truck and pull trailer. Additional belts can be positioned on the right and left sides at varying heights, further enhancing the visibility of the visual warning device 400. For example, one elongate belt 450 can positioned at a first height corresponding to the line of sight of the driver of a compact car, another elongate belt 450 can be positioned at a second height corresponding to the line of sight of the driver of a pick-up truck, and yet another elongate belt 450 can be added at a third height corresponding to the line of sight of a pedestrian.

Figure 6:
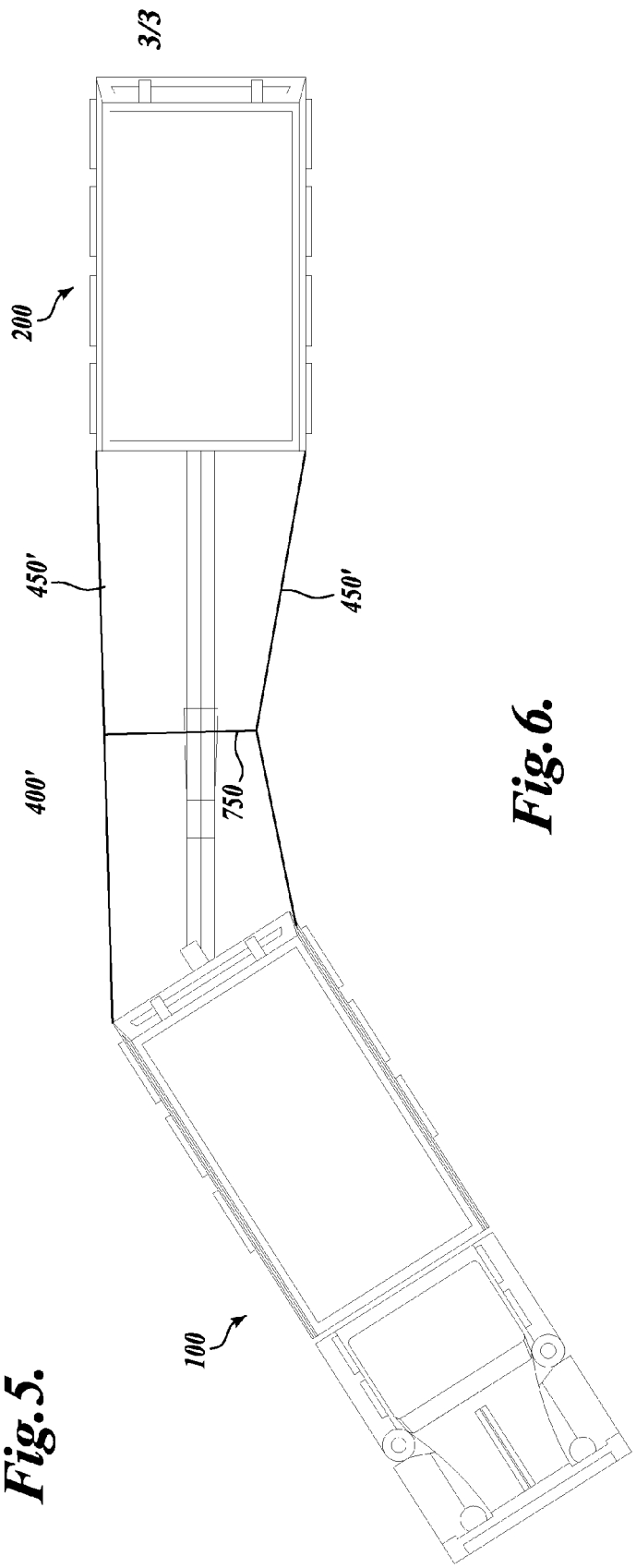
FIG. 6 is a top elevation view of a dump truck and pull trailer with two elongate belts and an equalizer strap.

In one embodiment, the visual warning device 400 includes an equalizer strap 750. FIG. 6 is top elevation view of a dump truck 100 and pull trailer 200 with two elongate belts 450' and an equalizer strap 750. Referring to FIG. 6, the equalizer strap 750 is attached to the first and second elongate belts 450'. The equalizer strap 750 is useful for keeping the elongate belts 450' from extending laterally beyond the wheelbase of the dump truck 100 and the pull trailer 200 during turns. The equalizer strap 750 is also useful for preventing one or more of the elongate belts 450' from excessive bowing or sagging during normal operation and maneuvering of the dump truck 100. For example, FIG. 6 shows the dump truck 100 making a left-hand turn. The equalizer strap 750 keeps the elongate belts 450' from extending laterally beyond the tracking of the vehicle, and also prevents the inside strap from sagging or from becoming caught in the wheels of the dump truck 100 or pull trailer 200. The equalizer strap 750 is also shown in FIG. 5. Referring to FIG. 5, the equalizer strap 750 is positioned essentially in an H-configuration between the elongate straps 450', approximately half way between the dump truck 100 and the pull trailer 200. The equalizer strap 750 can be made of any material, but is preferably made of an elastic or rubberized material to facilitate expansion and contraction of the strap.

In one embodiment, the elongate belt 450 is made of an elastic material. An elastic or rubberized material enables the elongate belt 450 to maintain the proper tension between the dump truck 100 and the pull trailer 200. The proper tension is one at which the elongate belt 450 does not sag, nor is it stretched to the point of breakage. The elastic material also permits the elongate belt 450 to stretch and return to the proper tension, for example when the dump truck 100 turns a corner. The elongate belt 450 can be made of any conspicuous material, such as a reflective material. Reflective material enhances the visibility of the elongate belt 450 in poor driving conditions, including rain, snow, fog, twilight, or nighttime. In addition, the elongate belt 450 can be made of brightly-colored material, such as fluorescent material, or have a noticeable pattern in order to enhance visibility during the day. The elongate belt 450 can also have an illuminated surface, for example, one with embedded or attached lights for enhanced nighttime visibility. The elongate belt 450 can also be flat or made with an abrasive outer surface, so that the belt produces an audible sound when contacted at freeway speeds (e.g. around 50 miles per hour and higher). The elongate belt can also incorporate a whistle, so that a whistling noise is produced at freeway speeds or below. In addition, the elongate belt 450 can be made from any combination of the above materials, for example, the belt can be fluorescent, reflective, and have an abrasive outer surface. Referring to FIG. 2, an elongate belt 450 with contrasting, diagonal stripes is shown. The stripes can be reflective and/or brightly colored and are highly visible compared to a monochromatic belt.

In one embodiment, at least one mounting 420, 440 has a quick-release fastener. A quick-release connection provides a rapid means of disconnecting the elongate belt 450 in the event that the dump truck 100 and the pull trailer 200 are separated.

In yet another aspect, the invention relates to a method of providing a visual indicator of a region between a dump truck and a pull trailer. The method includes the following steps: (a) providing a first bracket adapted to be connected to the dump truck; (b) providing a second bracket adapted to be connected to the pull trailer; (c) attaching a conspicuous, adjustable belt extending between the dump truck and the pull trailer, wherein the adjustable belt has a first end that is connected to the first bracket and a second end that is connected to the second bracket; and (d) adjusting the length of the adjustable belt such that the effective length of the adjustable belt is comparable to the interval between the dump truck and the pull trailer.

In one embodiment, the adjustable belt is releasably connected to one of the first and second brackets. In another embodiment, at least one end of the adjustable belt comprises a quick-release fastener.

In one embodiment, at least one end of the adjustable belt further comprises a locking device that can be used to attach a length of the adjustable belt to itself. A representative locking device is shown in FIG. 4. The locking device 600 can be removed and repositioned in order to adjust the length, and thus the tension of the adjustable belt.

In one embodiment the adjustable belt is brightly-colored or reflective.

In one embodiment, the adjustable belt is attached to the right side of the dump truck and the pull trailer, and another adjustable belt is attached to the left side of the dump truck and the pull trailer. The use of two or more adjustable belts enhances the visibility of the visual indicator. Additional adjustable belts can be added on either or both sides of the dump truck and pull trailer.

While illustrative embodiments have been illustrated and described, it will be appreciated that various changes can be made therein without departing from the spirit and scope of the invention.

The embodiments of the invention in which an exclusive property or privilege is claimed are defined as follows:

1. A visual warning device adapted to extend between a first cargo-carrying unit and a second cargo-carrying unit that is towed following the first cargo-carrying unit by a connecting drawbar, the visual warning device comprising:
   (a) a first mounting fixedly attached to the first cargo-carrying unit at a higher elevation than the connecting drawbar;
   (b) a second mounting fixedly attached to the second cargo-carrying unit at a higher elevation than the connecting drawbar; and
   (c) a first conspicuous, elongate belt having a first end that engages the first mounting and a second end that engages the second mounting;

wherein the first and second mountings are disposed between 48 inches and 80 inches above ground level.

2. The visual warning device of claim 1, wherein the first mounting comprises a first plate portion fixedly attached to the first cargo-carrying unit and a second plate portion pivotably attached to the first plate portion, and further wherein the first end of the elongate belt releasably engages the second plate portion.

3. The visual warning device of claim 2, wherein the second plate portion further comprises an aperture and the first end of the elongate belt further comprises a rigid hook that engages the second plate portion through the aperture.

4. The visual warning device of claim 1, wherein one of the first and second mountings adjustably engages the elongate belt such that the effective length of the elongate belt is adjustable.

5. The visual warning device of claim 1, wherein the elongate belt further comprises a locking device for fastening the elongate belt at a predetermined effective length.

6. The visual warning device of claim 1, wherein at least one of the first or second mountings comprises a take-up reel for the elongate belt.

7. The visual warning device of claim 1 further comprising a second conspicuous, elongate belt, wherein the first elongate belt is attached on a right side of the first and second cargo-carrying units and the second elongate belt is attached on a left side of the first and second cargo-carrying units.

8. The visual warning device of claim 7 further comprising an equalizer strap, wherein a first end of the equalizer strap is attached to the first elongate belt and a second end of the equalizer strap is attached to the second elongate belt.

9. The visual warning device of claim 1, wherein the elongate belt comprises an elastic material.

10. The visual warning device of claim 1, wherein the elongate belt comprises a reflective material.

11. The visual warning device of claim 1, wherein the elongate belt comprises a brightly-colored material.

12. The visual warning device of claim 1, wherein a surface of the elongate belt is illuminated.

13. The visual warning device of claim 1, wherein the elongate belt comprises an abrasive outer surface such that the belt produces an audible sound when contacted at freeway speeds.

14. A warning device for use with a transfer dump system comprising a dump truck and a pull trailer that is towed following the dump truck by the connecting drawbar, the warning device comprising:

(a) a first bracket fixedly connected to the dump truck at a higher elevation than the connecting drawbar;
(b) a second bracket fixedly connected to the pull trailer at a higher elevation than the connecting drawbar; and
(c) a conspicuous, tensioned strap extending between the dump truck and the pull trailer, wherein the tensioned strap has a first end that is connected to the first bracket and a second end that is connected to the second bracket
wherein the first and second brackets are disposed between 48 inches and 80 inches above ground level.

15. The warning device of claim 14, wherein the tensioned strap is releasably connected to one of the first and second brackets.

16. The warning device of claim 14, wherein the effective length of the tensioned strap is adjustable.

17. The warning device of claim 14, wherein the tensioned strap comprises an elastic, brightly colored material.

18. The warning device of claim 14, wherein the tensioned strap comprises a reflective material.

19. A method of providing a visual indicator of a region between a dump truck and a pull trailer that is towed following the dump truck by a connecting drawbar, the method comprising:

(a) providing a first bracket fixedly connected to the dump truck at a higher elevation than the connecting drawbar;
(b) providing a second bracket fixedly connected to the pull trailer at a higher elevation than the connecting drawbar;
(c) attaching a conspicuous, adjustable belt extending between the dump truck and the pull trailer, wherein the adjustable belt has a first end that is connected to the first bracket and a second end that is connected to the second bracket; and
(d) adjusting the length of the adjustable belt such that the effective length of the adjustable belt is comparable to an interval between the dump truck and the pull trailer;
wherein the first and second brackets are disposed between 48 inches and 80 inches above ground level.

20. The method of claim 19, wherein the adjustable belt is releasably connected to one of the first and second brackets.

21. The method of claim 19, further comprising a locking device that can be used to attach a length of the belt to itself.

22. The method of claim 19, wherein the adjustable belt is reflective.

23. The method of claim 19, wherein the adjustable belt is attached to a right side of the dump truck and the pull trailer and to a left side of the dump truck and the pull trailer.

* * * * *

UNITED STATES PATENT AND TRADEMARK OFFICE
CERTIFICATE OF CORRECTION

PATENT NO.        : 7,752,991 B2                                Page 1 of 1
APPLICATION NO.   : 12/037866
DATED             : July 13, 2010
INVENTOR(S)       : James D. Graves It is certified that error appears in the above-identified patent and that said Letters Patent is hereby corrected as shown below:

| COLUMN | LINE | ERROR |
|---|---|---|
| Title Page (76) Pg. 1, col. 1 | Inventor | "James D Graves," should read --James D. Graves,-- |
| 8 | 8 | after "second bracket" insert --;-- |

Signed and Sealed this

Ninth Day of November, 2010

David J. Kappos
*Director of the United States Patent and Trademark Office*